(12) United States Patent
González-Baños et al.

(10) Patent No.: US 7,161,606 B2
(45) Date of Patent: Jan. 9, 2007

(54) SYSTEMS AND METHODS FOR DIRECTLY GENERATING A VIEW USING A LAYERED APPROACH

(75) Inventors: Héctor H. González-Baños, Mountain View, CA (US); Hai Tao, Santa Cruz, CA (US); Dan Kong, Santa Cruz, CA (US)

(73) Assignees: Honda Motor Co., Ltd., Tokyo (JP); The Regents of the University of California, Oakland, CA (US)

( * ) Notice: Subject to any disclaimer, the term of this patent is extended or adjusted under 35 U.S.C. 154(b) by 1 day.

(21) Appl. No.: 10/937,034

(22) Filed: Sep. 8, 2004

(65) Prior Publication Data

US 2005/0151759 A1    Jul. 14, 2005

Related U.S. Application Data

(60) Provisional application No. 60/501,288, filed on Sep. 8, 2003.

(51) Int. Cl.
*G09G 5/00* (2006.01)
(52) U.S. Cl. ................ 345/646; 345/427; 345/589; 345/629; 345/647; 345/648; 382/106; 382/154
(58) Field of Classification Search ........ 345/427, 345/629, 646, 647, 648, 589, 419; 382/106, 382/154
See application file for complete search history.

(56) References Cited

U.S. PATENT DOCUMENTS 6,606,406 B1 * 8/2003 Zhang et al. .............. 382/154

2004/0095357 A1 * 5/2004 Oh et al. .................... 345/589

OTHER PUBLICATIONS

Angel, E., *Interactive Computer Graphics: A top-down approach with OpenGL*, 1997, pp. 278-280, Addison Wesley Longman., Inc., USA.

Baker, S. et al., A Layered Approach to Stereo Reconstruction, *IEEE Computer Society Conference and Pattern Recognition*, 1998, pp. 434-441.

Boykov, Y. et al., Fast Approximate Energy Minimization Via Graphs Cuts, *Seventh International Conference on Computer Vision*, 1999.

Burschka, D., Recent Methods for Image-Based Modeling and Rendering, IEEE Virtual Reality 2003 Tutorial 1, Mar. 2003, [online] [Retrieved on Sep. 9, 2004] Retrieved from the Internet<URL:http://www.cs.ucsb.edu/~holl/CS595B/handouts/VR2003TutorialNotes.pdf>.

Chai, J.-X et al., Plenoptic Sampling, *Computer Graphics (SIGGRAPH '2000)*, 2000.

(Continued)

*Primary Examiner*—Kimbinh T. Nguyen
(74) *Attorney, Agent, or Firm*—Fenwick & West LLP; Mark E. Duell

(57) ABSTRACT

Apparatuses and methods are presented that use a direct synthesis approach using layers in order to directly generate a virtual view from a pair of images. In one embodiment, a range space is discretized into a plurality of layers. For each layer, the first input image and the second input image are warped to the layer. A matching score is then determined for each pixel in the new view based on the warped input images. For each pixel in the virtual view, a best layer is determined. After the best layer has been determined, the color of the pixel in that layer is used for that pixel in the generated view.

19 Claims, 6 Drawing Sheets

OTHER PUBLICATIONS

Chen, S. et al., View Interpolation for Image Synthesis, *Computer Graphics (SIGGRAPH'93)*, 1993, pp. 279-288.

Debevec, P.E., et al., Modeling and Rendering Architecture From Photographs: A Hybrid Geometry and Image-Based Approach, *Computer Graphics (SIGGRAPH'96)*, 1996, pp. 11-20.

Dhond, U.R. et al., Structure From Stereo-A Review, *IEEE Transaction on Systems, Man, and Cybernetics*, 1989, pp. 1489-1510.

Gortler, S.J. et al., The Lumigraph, *Computer Graphics (SIGRAPH'96)*, 1996.

Hartley, R. et al., Multiple View Geometry, CVPR Jun. 1999, [online] [Retrieved on Sep. 9, 2004] Retrieved from the Internet<URL:http://rsise.anu.edu.au/~hartley/Papers/CVPR99-tutorial/tut_4up.pdf>.

Kutulakos, K. N. et al., A Theory of Shape by Space Carving, *International Journal of Computer Vision*, 2000, pp. 199-218.

Levoy, M. et al., Light Field Rendering, *Computer Graphics (SIGRAH'96)*, 1996.

McMillan, L., An Image-Based Approach to Three-Dimensional Computer Graphics, PhD Thesis, UNC Computer Science, 1999.

Ng, K.C, et al., Generalized Multiple Baseline Stereo and Direct Virtual View Synthesis Using Range-Space Search, Match and Render, *International Journal of Computer Vision*, 2002, pp. 131-147.

Roy, S et al., A Maximum-Flow Formulation of the N-Camera Stereo Correspondence Problem, *International Conference of Computer Vision*, 1998.

Seitz, S. et al., View Morphing, *Computer Graphics (SIGGRAPH'96)*, 1996, pp. 21-30.

Seitz, S. et al., Photorealistic Scene Reconstruction by Voxel Coloring, *International Journal of Computer Vision*, 1999, pp. 151-173.

Shade, J. et al., Layered Depth Images, *Computer Graphics (SIGGRAPH'96)*, 1998, pp. 231-242.

Shum, H. et al., A Review of Image-Based Rendering Techniques, *IEEE/SPIE Visual Communications and Image Processing*, 2000, pp. 2-13.

Szeliski, R., A Multi-View Approach to Motion and Stereo, *IEEE Computer Society Conference and Pattern Recognition*, 1999.

Tao, H. et al., A Global Matching Framework For Stereo Computation, *International Conference on Computer Vision*, 2001.

Trucco, E. et al., Introductory Techniques for 3-D Computer Vision, 1998, pp. 139-175, Prentice Hall, Inc., New Jersey.

Zhang, Z., A Flexible New Technique for Camera Calibration, *IEEE Transactions on Pattern Analysis and Machine Intelligence*, 2000, pp. 1330-1334.

Zitnick, C.L. et al., A Cooperative Algorithm for Stereo Matching and Occlusion Detection, *IEEE Transactions on Pattern Analysis and Machine Intelligence*, 2000.

PCT International Search Report and Written Opinion, PCT/US04/29262, Dec. 9, 2005.

\* cited by examiner

SYSTEMS AND METHODS FOR DIRECTLY GENERATING A VIEW USING A LAYERED APPROACH

CROSS-REFERENCE TO RELATED APPLICATION

This application claims priority from the following U.S. provisional patent application, which is hereby incorporated by reference: Ser. No. 60/501,288, filed on Sep. 8, 2003, entitled "Sparse Image-Based Rendering Using Range Space Rendering."

BACKGROUND OF THE INVENTION

1. Field of the Invention

The present invention relates to using computing devices to directly generate a virtual view of a scene. More particularly, the present invention relates to a direct synthesis approach using layers in order to directly generate a virtual view from a pair of images.

2. Description of Background Art

The field of image-based rendering (IBR) covers using a set of input images of a scene from particular viewpoints to generate a new (synthetic) image of the scene from a new viewpoint. IBR techniques can be classified based on how a scene's geometry is used and represented. At one end of the spectrum, there are techniques that require little or no geometric information about the scene, such as the Light Field and Lumigraph methods. These techniques require special capturing equipment and use a very large input image database, even for very small objects. Thus, they are called dense IBR methods. Dense IBR methods have the disadvantage of requiring a fairly large number of input images, high equipment complexity, and a large amount of image storage.

At the other end of the spectrum, there are techniques that use relatively few input images, but require more geometric information about the scene. These "sparse IBR" methods use a set of input images and their associated depth maps to render a synthetic image. When depth information is available for every point in an input image, the image can be rendered from any nearby point of view by projecting the pixels of the input image into the scene and then re-projecting these pixels onto the synthetic image. Fewer input views means simpler equipment setups and smaller storage requirements. However, the quality of the synthetic view depends heavily on the accuracy of the geometric information.

One sparse IBR approach is to compute a depth representation using a stereo algorithm. Stereo techniques must solve the Stereo Correspondence problem, where each pixel in a first input image must be matched (i.e., recognized as the same object) to a pixel in a second input image. Traditional stereo algorithms cannot fully solve the Stereo Correspondence problem for objects of uniform color and texture because of matching ambiguity. As a result, stereo algorithms fail to recover the accurate depth of objects in this situation. Moreover, stereo techniques applied to IBR attempt to compute the depth at every pixel of an input image, regardless of whether the pixel is used in the final synthetic view. Also, computing high-quality synthetic images using stereo-based approaches can be computationally expensive.

An alternative to the traditional stereo-based approach is to perform calculations from the point of view of the synthetic view. This is called direct-view synthesis, and depth is computed at only the locations that are relevant to the rendering of the synthetic image. An advantage of this approach is that accurate geometry is not needed for surfaces of uniform color and texture. That is, methods using the direct-view synthesis approach can afford to make mistakes in the depth calculation at those locations where geometry is unimportant. Thus, it is irrelevant that the stereo correspondence problem becomes difficult in those situations.

One direct-view synthesis method is the Range-Space Approach, which uses a voxel representation of the scene. This method casts a viewing ray from the virtual viewpoint for every pixel in the synthetic image, cutting through the voxel representation of the scene. The problem consists in finding the voxel that corresponds to a physical surface. This is indicated when the neighborhood around a voxel is colored in a similar fashion by all input views. The procedure requires a volumetric matching template to compute scores along the viewing ray. The method has the advantage of producing directly-synthesized virtual views. But, like other voxel-based methods, it is computationally expensive and unlikely to compute high-quality synthetic views in real-time.

What is needed is a direct-view synthesis method that avoids the problems of the Range-Space Approach.

SUMMARY OF THE INVENTION

Apparatuses and methods are presented that use a direct synthesis approach using layers in order to directly generate a virtual view from a pair of images. In one embodiment, a virtual view is generated as follows: A range space is discretized into a plurality of layers. In one embodiment, the number of layers is proportional to the volume of the range space and inversely proportional to the quality of the virtual view to be generated.

For each layer, the first input image and the second input image are warped to the layer. In one embodiment, backward (inverse) warping is used, along with bilinear interpolation. A matching score is then determined for each pixel in the new view based on the warped input images. In one embodiment, a matching score is determined based on the statistical correlation between the pixel's neighborhoods in the warped images.

For each pixel in the virtual view, a best layer is determined. In one embodiment, the layer that yields the greatest matching score is chosen. After the best layer has been determined, the color of the pixel in that layer is used for that pixel in the generated view. In one embodiment, the color is determined by a weighted combination of corresponding pixels of the input images according to the pixel's depth from the virtual viewpoint.

In one embodiment, the input images are rectified before they are warped. In another embodiment, the virtual viewpoint is assumed to be on the baseline. In yet another embodiment, a coarse-to-fine scheme is used to solve the repetitive pattern problem. In yet another embodiment, local depth voting is used to enforce scene consistency and detect occlusions.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION OF THE EMBODIMENTS

Figure 1:
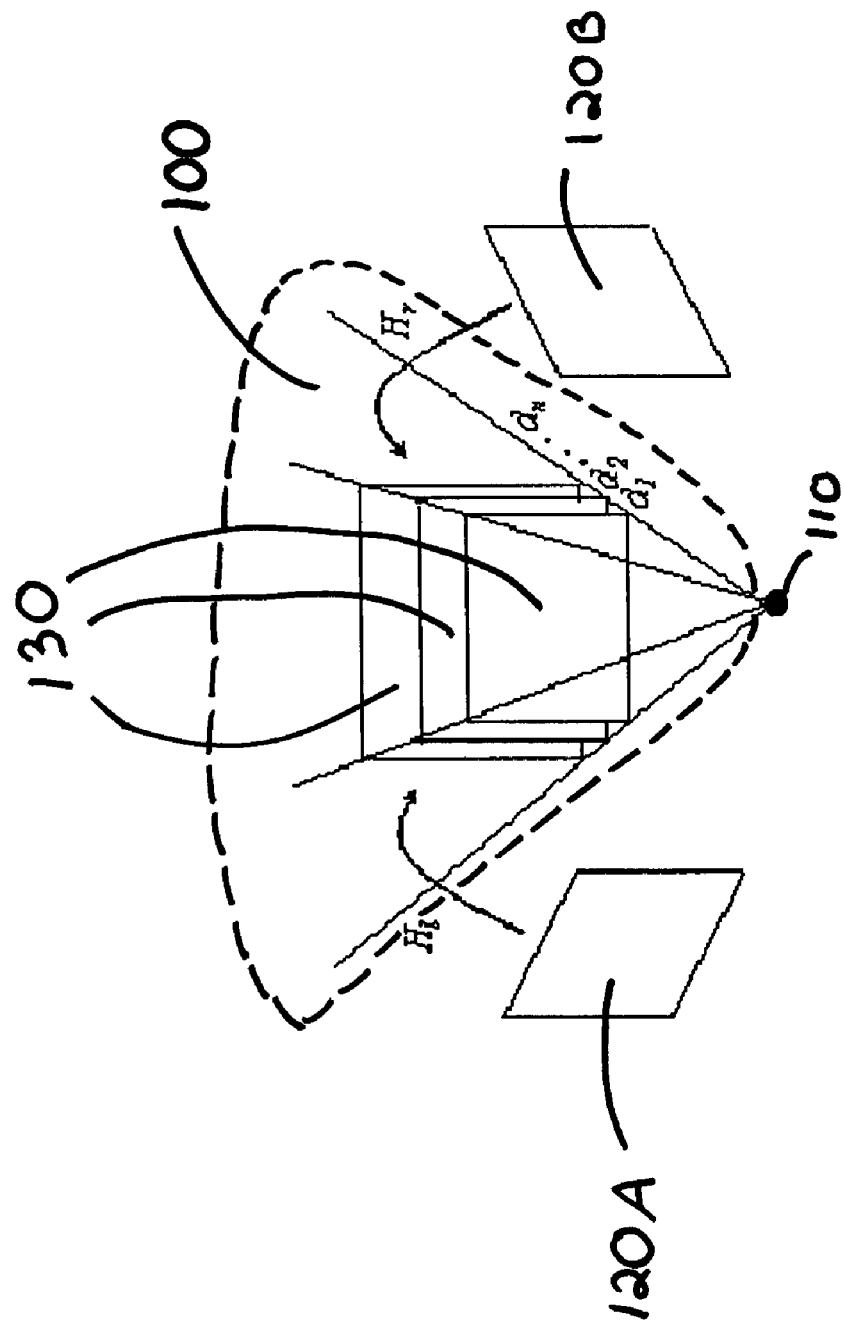
FIG. 1 illustrates a three-dimensional range space representation, a new viewpoint, and input images, according to one embodiment of the invention.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to an apparatus for performing the operations herein. This apparatus is specially constructed for the required purposes, or it comprises a general-purpose computer selectively activated or reconfigured by a computer program stored in the computer. Such a computer program is stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems are used with programs in accordance with the teachings herein, or more specialized apparatus are constructed to perform the required method steps. The required structure for a variety of these systems will appear from the description below. In addition, the present invention is not described with reference to any particular programming language. It will be appreciated that a variety of programming languages may be used to implement the teachings of the invention as described herein.

1. Overview of Technique for Generating a Virtual View From a Pair of Images

As described above, a direct-view synthesis technique uses one or more input images of a scene from particular viewpoints to generate a new (virtual) image of the scene from a new viewpoint. FIG. 1 illustrates a three-dimensional range space representation, a new viewpoint, and input images, according to one embodiment of the invention. The illustrated embodiment includes a range space 100, a viewpoint 110, and two input images 120A and 120B.

Range space 100 comprises a three-dimensional space that includes a scene for which a new (virtual) image is desired. The new image is the view of the range space 100 that results from viewpoint 110. Viewpoint 110 is a virtual viewpoint. No image sensor need exist at viewpoint 110 in order to create an image from that viewpoint.

Input images 120A and 120B comprise images of the range space 100 from different viewpoints (not shown). A portion of input image 120A and a portion of input image 120B overlap, so that a sufficiently large portion of the range space 100 is visible in both input images 120A and 120B.

In one embodiment, an input image 120 is a conventional image that was generated by an image sensor, such as a camera. Input images 120A and 120B can generated from one image sensor, two image sensors, or a video sequence. For example, an image sensor can be placed in a first position to capture input image 120A and then placed in a second position to capture input image 120B. As another example, a first image sensor can be placed in a first position to capture input image 120A and a second image sensor can be placed in a second position to capture input image 120B. As yet another example, a video image sensor can move from a first position to a second position while being directed toward range space 100. Frames from the resulting video sequence can be used as input images 120A and 120B.

Figure 2:
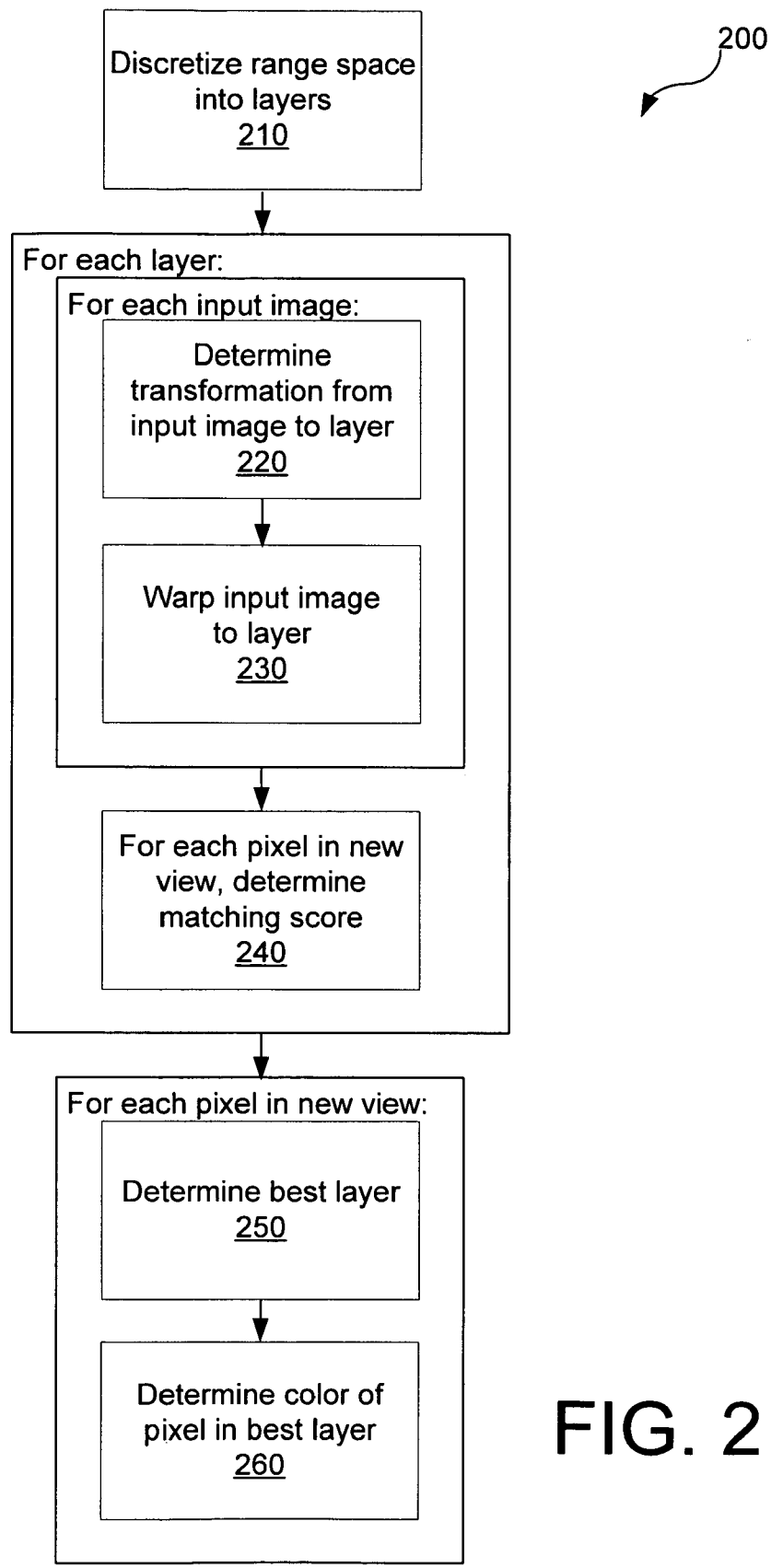
FIG. 2 illustrates a flowchart of a method for using a direct synthesis approach using layers in order to directly generate a virtual view from a pair of images, according to one embodiment of the invention.

As described above, the Range-Space Approach of direct-view synthesis is computationally expensive and unlikely to compute high-quality synthetic views in real-time. This is because the Range-Space Approach uses voxels—three-dimensional geometry requires a great deal of computation. Working with two-dimensional geometry, such as planes, would be much easier. FIG. 2 illustrates a flowchart of a method for using a direct synthesis approach using layers in order to directly generate a virtual view from a pair of images, according to one embodiment of the invention.

In the first step of method 200, range space 100 is discretized 210 into layers 130. A layer 130 comprises a plane that is at a constant depth d from a plane containing viewpoint 110. In one embodiment, the number of layers 130 is proportional to the volume of range space 100 and inversely proportional to the quality of the image to be generated.

A two-dimensional projective transformation (also called a "homography" or "collineation") from an input image 120 to a particular depth layer 130 is determined 220. The transformation depends on the viewpoint used to generate an input image 120 and the particular depth layer 130. Techniques for determining a two-dimensional projective transformation are known to those of ordinary skill in the art and are further discussed in Introductory Techniques for 3-D Computer Vision by E. Trucco and A. Verri, 1998, pp. 139–175, Prentice-Hall Inc., New Jersey.

The transformation is then used to warp 230 the input image 120 to the particular layer 130. (Input images 120A and 120B can be obtained at any time prior to step 230, including before method 200 begins.) The resulting transformed coordinates can be non-integers. In other words, the transformed coordinates will not always correspond to pixel locations in the layer 130. In one embodiment, backward (inverse) warping is used to address this problem, along with bilinear interpolation. For example, an inverse transformation is used to map a pixel location in a layer 130 to a position in an input image 120. If the transformed coordinates are not integers, the pixel can be computed as the bilinear interpolation of the four surrounding pixels in the input image 120. Backward warping and bilinear resampling are known to those of ordinary skill in the art and are further discussed in Introductory Techniques for 3-D Computer Vision by E. Trucco and A. Verri, 1998, pp. 139–175, Prentice-Hall Inc., New Jersey. In one embodiment, steps 220 and 230 are performed for each input image 120.

After input images 120A and 120B have been warped 230, a matching score is determined 240 for each pixel in the new view given a particular depth layer 130. This matching score reflects the correspondence between the warped images at that pixel in that depth layer 130. In one embodiment, the matching score is determined based on the statistical correlation between the pixel's neighborhoods in the warped images. A neighborhood can be, for example, a square of seven pixels by seven pixels that surrounds the pixel in question. The statistical correlation can be defined as, for example, the absolute squared intensity difference (SAD) or the sum of the squared difference (SSD). Matching scores are known to those of ordinary skill in the art and are further discussed in Introductory Techniques for 3-D Computer Vision by E. Trucco and A. Verri, 1998, pp. 139–175, Prentice-Hall Inc., New Jersey. In one embodiment, steps 220, 230, and 240 are performed for each depth layer 130.

After the matching scores have been determined 240, the "best" layer is determined 250 for each pixel in the new image. In one embodiment, the winner-take-all principle is used to determine 250 the best layer 130. In this embodiment, for each pixel in the new image, the layer 130 that yields the greatest matching score is chosen. Other selection methods that can be used include, for example, identifying the best k layers 130 (where k is an integer greater than 1) and then performing a consistency check to choose one "best" layer 130.

After the best layer 130 for a pixel has been determined 250, a color is determined 260 for that pixel. In one embodiment, the color of the pixel in the best layer 130 is used for that pixel in the generated view. In one embodiment, the color is determined 260 by a weighted combination of corresponding pixels of the input images 120 according to the pixel's depth from viewpoint 110. In one embodiment, a weight is a function of the angle and distance between viewpoint 110 (the viewpoint of the new view) and the viewpoint of the input image 120.

The desired view can contain an occluded region. For example, there can be a portion of the new view that is visible in a first input image 120 and not visible (or only partially visible) in a second input image 120. In one embodiment, it is determined in which input image 120 an occluded region is visible. In one embodiment, this is accomplished by using the z-buffer algorithm to record visibility information, in an input image 120, for each pixel in the desired view. This visibility map enables pixels to be chosen from the appropriate input image 120 for the occluded region. The z-buffer algorithm is known to those of ordinary skill in the art and is further discussed in Interactive Computer Graphics: A top-down approach with OpenGL by E. Angel, 1997, pp. 278–280, Addison Wesley Longman, Inc., USA.

A. Coarse-to-Fine Scheme

Figure 3:
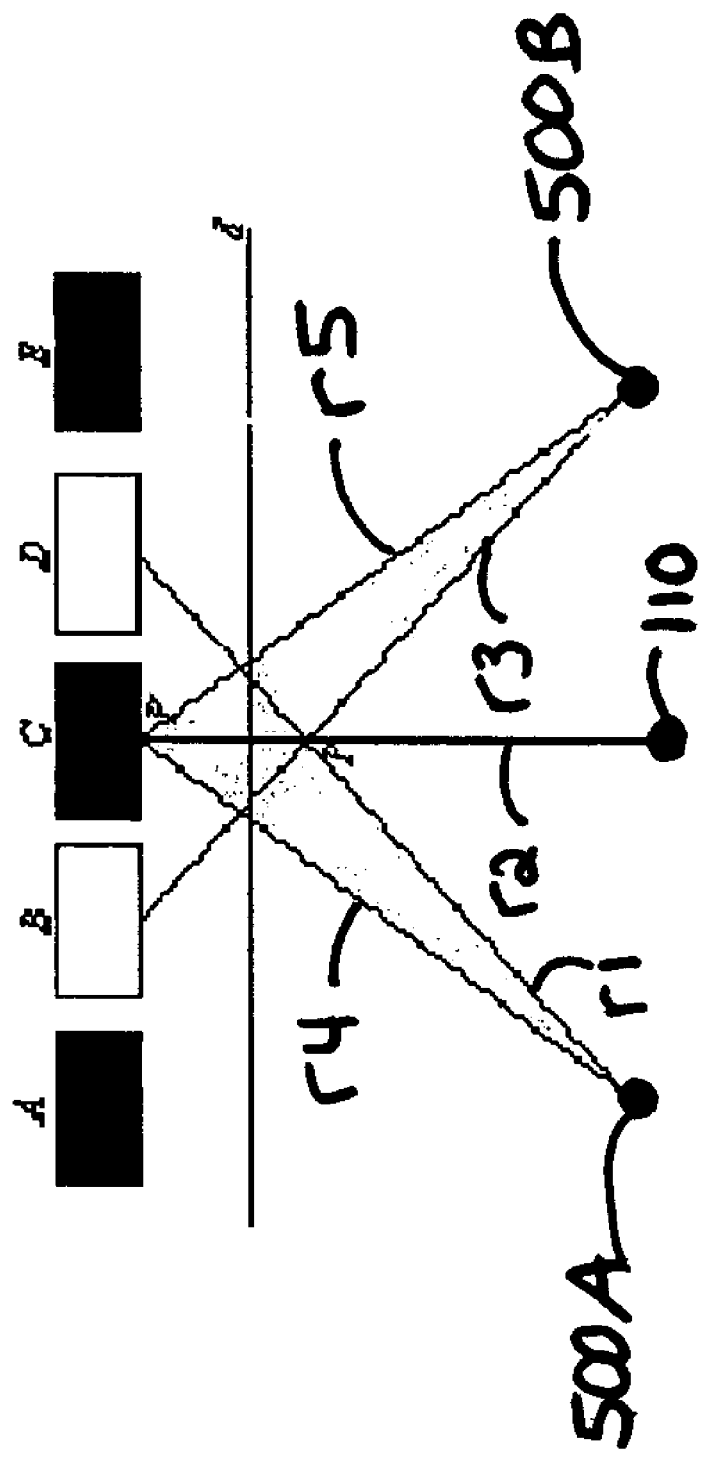
FIG. 3 illustrates a repetitive pattern, according to one embodiment of the invention.

When a scene contains a repetitive pattern, method 200 may not generate an accurate new view. FIG. 3 illustrates a repetitive pattern, according to one embodiment of the invention. The illustrated embodiment includes a repetitive pattern of black and white rectangles A-B-C-D-E, one virtual viewpoint 110, and two viewpoints 500A and 5.00B of input images 120 (not shown). Rays from a viewpoint to the repetitive pattern are also shown. Ray $r_4$ extends from viewpoint 500A to rectangle C. Ray $r_1$ extends from viewpoint 500A to rectangle D. Ray $r_3$ extends from viewpoint 500B to rectangle B. Ray $r_5$ extends from viewpoint 500B to rectangle C.

Rays $r_4$ (from viewpoint 500A) and $r_5$ (from viewpoint 500B), which intersect at point P', yield a high matching score because they both see the same rectangle (black rectangle C). However, rays $r_1$ (from viewpoint 500A) and $r_3$ (from viewpoint 500B), which intersect at point P, also yield a high matching score because they both see the same pattern—a white rectangle (rectangles D and B, respectively).

Figure 4B:
FIG. 4B illustrates a virtual view generated using the coarse-to-fine scheme, according to one embodiment of the invention.
Figure 4A:
FIG. 4A illustrates a virtual view generated using the method described in FIG. 2, according to one embodiment of the invention.

Virtual ray $r_2$, which extends from virtual viewpoint 110, should indicate a black pixel (from black rectangle C) in the generated image. However, if the matching score at P' is higher than the matching score at P, a white pixel will be incorrectly chosen instead. This situation is shown in FIG. 4A. FIG. 4A illustrates a virtual view generated using the method described in FIG. 2, according to one embodiment of the invention. The virtual view includes a repetitive pattern, namely, a white ladder on a dark surface. Note how the virtual view includes "phantom" rungs where no rungs are actually present.

Obtaining a rough estimate of the scene at a layer 130 for each virtual ray extending from virtual viewpoint 110 and then restricting the matching search to a range from this layer 130 can solve this problem. In the illustrated embodiment, for example, a rough estimate can be obtained of the scene at layer d for virtual ray $r_2$.

In one embodiment, a coarse-to-fine scheme is used to solve the repetitive pattern problem. One or more rough (coarse) estimates of the scene are obtained. A rough estimate has a lower resolution than that of the final virtual view.

For example, a rough estimate can have half as many columns of pixels and half as many rows of pixels as the final virtual view. Fewer columns and rows means fewer pixels in the image and therefore a lower resolution.

Depth is obtained for each pixel in the rough estimate that has the lowest resolution. This depth is then propagated to the rough estimate with the next highest resolution. (If only one rough estimate was obtained, then the "rough estimate with the next highest resolution" is actually the final virtual view.) Depth is propagated by restricting the matching search in the higher-resolution rough estimate to a range from the depth that was obtained for the lower-resolution rough estimate. In this way, a refined depth can be obtained. FIG. 4B illustrates a virtual view generated using the coarse-to-fine scheme, according to one embodiment of the invention. While the virtual view in FIG. 4B includes the same repetitive pattern as FIG. 4A, note that the virtual view in FIG. 4B does not include "phantom" rungs where no rungs are actually present.

B. Local Depth Voting

In one embodiment, a local depth map for a new view is refined based on a weak constraint called scene consistency. As discussed above, direct-view synthesis techniques do not always compute correct depth for smooth areas and occluded regions. However, for points in the scene that are visible in both input views 120, we can assume that they are in the same three-dimensional position when seen from each viewpoint. This assumption is known as scene consistency.

In one embodiment, a local depth voting strategy is used to enforce the scene consistency constraint. In one embodiment, for each pixel (x,y) in a new view, the corresponding depth information for the other viewpoints is collected. A function LocalVote(x, y) is applied to these depth values to check the scene consistency. A non-empty return value means that the scene consistency is satisfied for that pixel. If this occurs, the depth of that pixel is refined according to the voting results. Otherwise, the pixel retains its original depth.

Local depth voting can also be used to detect occlusions in a new view. The following mask function is used to detect an occluded region in a new view:

$$H(i, j) = \begin{cases} 1 & (\text{Match}(i, j) < \text{threshold}) \,\&\&\, (LocalVote(i, j) = \text{Empty}) \\ 0 & \text{else} \end{cases}$$

where Match(i,j) is known to those of skill in the art and is further discussed in "A cooperative algorithm for stereo matching and occlusion detection" by C. L. Zitnick and T. Kanade, IEEE Transactions on Pattern Analysis and Machine Intelligence, 2000.

After an occluded region has been detected, an iterative hole-filling method can be used to determine the depth of each pixel that has been marked as a hole.

C. Rectification

In one embodiment, the position of the image sensor used to generate input image 120A is parallel to the position of the image sensor used to generate input image 120B. For example, the position of the optical center of the image sensor that used to generate input image 120A is displaced along the baseline in relation to the position of the optical center of the image sensor that used to generate input image 120B. In this embodiment, input images 120A and 120B are translations of each other along the scanline. In other words, a pixel in a particular row in input image 120A corresponds to a pixel in that same row in input image 120B. However, the column in which that pixel is found varies between input image 120A and input image 120B and thus needs to be determined. When input images 120A and 120B are translations of each other, it is easier to determine the correspondence between them. In one embodiment, the number of layers 130 is proportional to the amount of disparity between input images 120A and 120B. For example, the number of layers 130 can be equal to the difference between the maximal and minimal disparities of input images 120A and 120B.

In one embodiment, the position of the image sensor used to generate input image 120A is not parallel to the position of the image sensor used to generate input image 120B. For example, these positions can be arbitrary. In this embodiment, input images 120A and 120B are not initially translations of each other. In one embodiment, input images 120A and 120B are rectified so that they are translations of each other and thus simplify range space matching. For example, input images 120 are rectified before their transformations are determined in step 220. To rectify input images 120A and 120B, intrinsic and extrinsic parameters of the positions of an image sensor used to generate these images 120 should be known. These parameters can be obtained, for example, through calibration. Techniques for rectifying images are known to those of ordinary skill in the art and are further discussed in Introductory Techniques for 3-D Computer Vision by E. Trucco and A. Verri, 1998, pp. 139–175, Prentice-Hall Inc., New Jersey.

In one embodiment, viewpoint 110 is on the baseline. In one embodiment, even if viewpoint 110 is not on the baseline, it is assumed to be on the baseline. When viewpoint 110 is (or is assumed to be) on the baseline, depth steps in range space 100 correspond to sub-pixel shifts along the horizontal epipolar line in the space of the desired image. Also, it is easier to warp an input image 120 to a layer 130.

Additionally, in this embodiment, convolution operators can be used to determine 240 a matching score for each pixel in the new view for all depth layers 130. In one embodiment, hardware acceleration is used for this computation by exploiting the convolution functions available in modern processors and/or using accumulation buffers of modern graphical processors.

D. Calibration

In one embodiment, before an image sensor generates an input image 120, the image sensor is calibrated. In one embodiment, the camera fundamental matrix is computed by using a planar checkerboard pattern as a calibration object according to the algorithms discussed in "A flexible new technique for camera calibration" by Z. Zhang, IEEE Transactions on Pattern Analysis and Machine Intelligence, pp. 1330–1334, 2000. Since these algorithms also determine the three-dimensional pose of an image sensor with respect to an object, the relative pose between the position of an image sensor used to generate input image 120A and the position of an image sensor used to generate input image 120B can also be determined.

2. Apparatus for Generating a Virtual View From a Pair of Images

Figure 5:
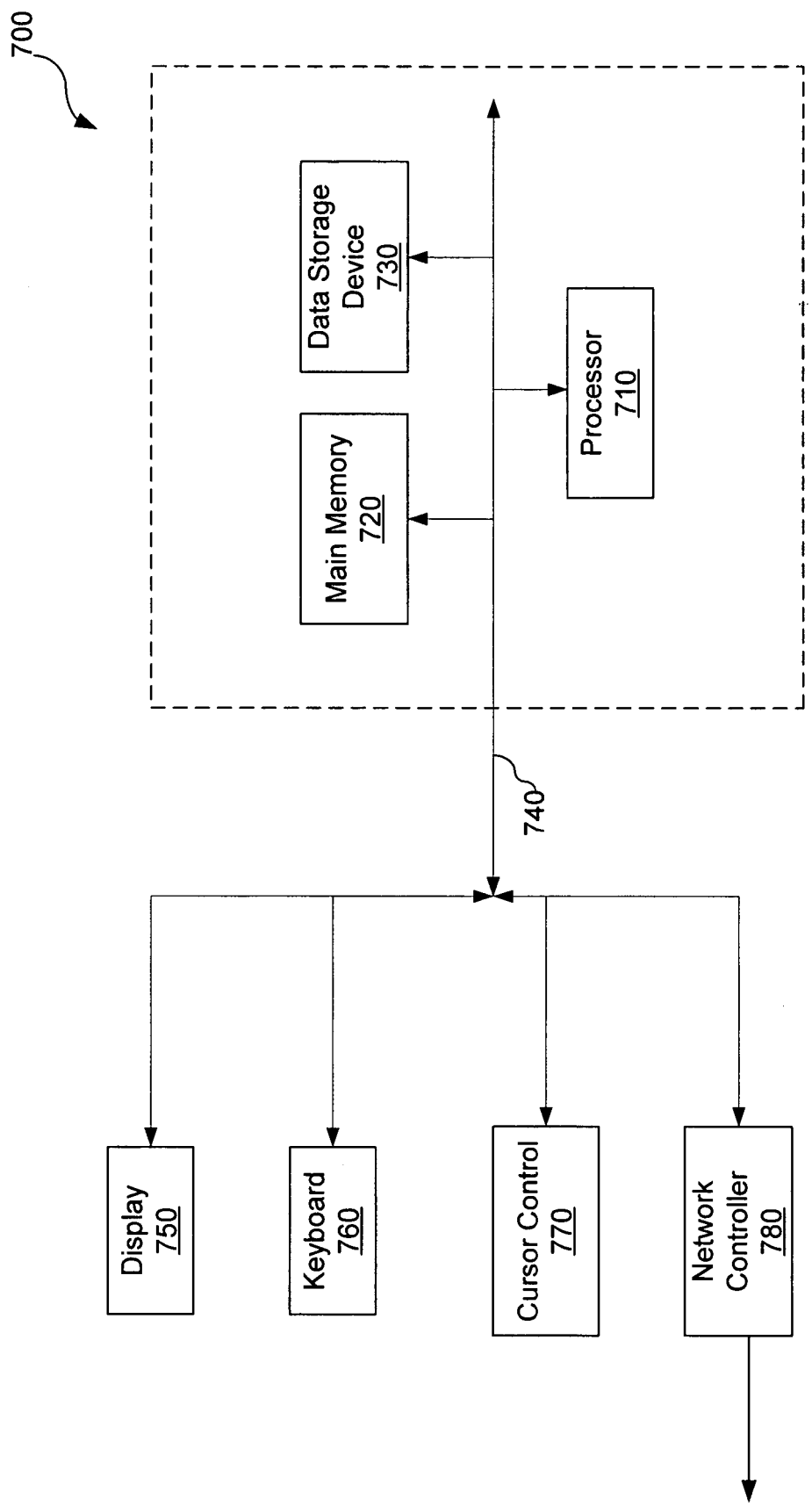
FIG. 5 illustrates a block diagram of an apparatus for using a direct synthesis approach using layers in order to directly generate a virtual view from a pair of images, according to one embodiment of the invention.

FIG. 5 illustrates a block diagram of an apparatus for using a direct synthesis approach using layers in order to directly generate a virtual view from a pair of images, according to one embodiment of the invention. Apparatus 700 preferably includes a processor 710, a main memory 720, a data storage device 730, and an input/output controller 780, all of which are communicatively coupled to a system bus 740. Apparatus 700 can be, for example, a general-purpose computer.

Processor 710 processes data signals and comprises various computing architectures including a complex instruction set computer (CISC) architecture, a reduced instruction set computer (RISC) architecture, or an architecture implementing a combination of instruction sets. Although only a single processor is shown in FIG. 5, multiple processors may be included.

Main memory 720 stores instructions and/or data that are executed by processor 710. The instructions and/or data comprise code for performing any and/or all of the techniques described herein. Main memory 720 is preferably a dynamic random access memory (DRAM) device, a static random access memory (SRAM) device, or some other memory device known in the art.

Data storage device 730 stores data and instructions for processor 710 and comprises one or more devices including a hard disk drive, a floppy disk drive, a CD-ROM device, a DVD-ROM device, a DVD-RAM device, a DVD-RW device, a flash memory device, or some other mass storage device known in the art.

Network controller 780 links apparatus 700 to other devices so that apparatus 700 can communicate with these devices.

System bus 740 represents a shared bus for communicating information and data throughout apparatus 700. System bus 740 represents one or more buses including an industry standard architecture (ISA) bus, a peripheral component interconnect (PCI) bus, a universal serial bus (USB), or some other bus known in the art to provide similar functionality.

Additional components that may be coupled to apparatus 700 through system bus 740 include a display device 750, a keyboard 760, and a cursor control device 770. Display device 750 represents any device equipped to display electronic images and data to a local user or maintainer. Display device 750 is a cathode ray tube (CRT), a liquid crystal display (LCD), or any other similarly equipped display device, screen, or monitor. Keyboard 760 represents an alphanumeric input device coupled to apparatus 700 to communicate information and command selections to processor 710. Cursor control device 770 represents a user input device equipped to communicate positional data as well as command selections to processor 710. Cursor control device 770 includes a mouse, a trackball, a stylus, a pen, cursor direction keys, or other mechanisms to cause movement of a cursor.

It should be apparent to one skilled in the art that apparatus 700 includes more or fewer components than those shown in FIG. 5 without departing from the spirit and scope of the present invention. For example, apparatus 700 may include additional memory, such as, for example, a first or second level cache or one or more application specific integrated circuits (ASICs). As noted above, apparatus 700 may be comprised solely of ASICs. In addition, components may be coupled to apparatus 700 including, for example, image scanning devices, digital still or video cameras, or other devices that may or may not be equipped to capture and/or download electronic data to/from apparatus 700.

Figure 6:
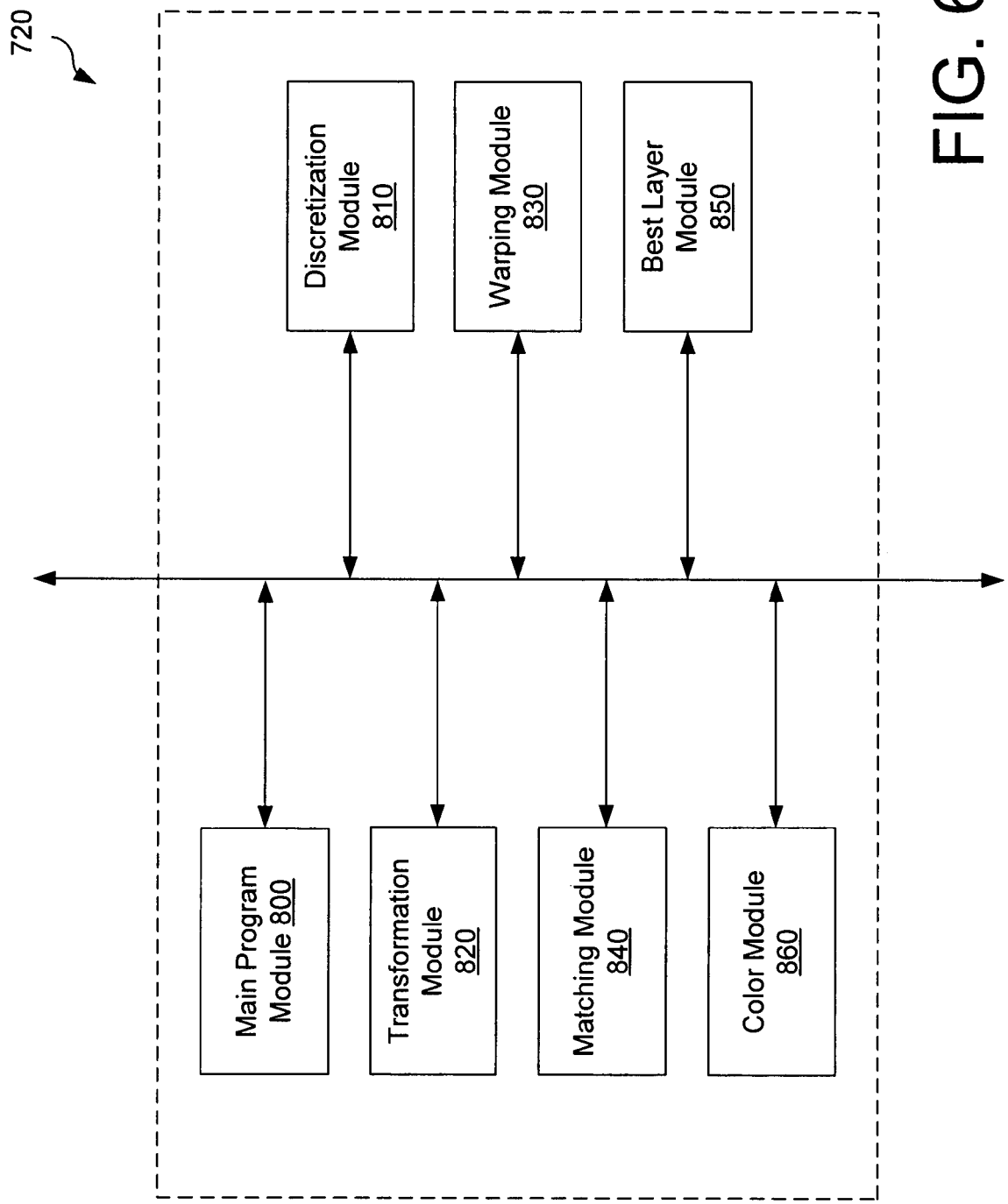
FIG. 6 illustrates a more detailed block diagram of the contents of the memory unit in FIG. 5.

FIG. 6 illustrates a more detailed block diagram of the contents of the memory unit in FIG. 5. Generally, memory unit 720 comprises several code modules for using a direct synthesis approach using layers in order to directly generate a virtual view from a pair of images. Specifically, the code modules in memory unit 720 include main program module 800, discretization module 810, transformation module 820, warping module 830, matching score module 840, best layer module 850, and color module 860.

All code modules 810, 820, 830, 840, 850, 860 are communicatively coupled to main program module 800. Main program module 800 centrally controls the operation and process flow of apparatus 800, transmitting instructions and data to as well as receiving data from each code module 810, 820, 830, 840, 850, 860.

Discretization module 810 performs step 210 of method 200. Transformation module 820 performs step 220 of method 200. Warping module 830 performs step 230 of method 200. Matching score module 840 performs step 240 of method 200. Best layer module 850 performs step 250 of method 200. Color module 860 performs step 260 of method 200.

Main program module 800 instructs discretization module 810 module to perform step 210 of method 200. Main program module 800 instructs transformation module 820 to perform step 220 of method 200. Main program module 800 instructs warping module 830 to perform step 230 of method 200. Main program module 800 instructs matching score module 840 to perform step 240 of method 200. Main program module 800 instructs best layer module 850 to perform step 250 of method 200. Main program module 800 instructs color module 860 to perform step 260 of method 200.

Although the invention has been described in considerable detail with reference to certain embodiments thereof, other embodiments are possible as will be understood to those skilled in the art.

What is claimed is:

1. A method for generating a virtual image of a range space from a first input image of the range space and a second input image of the range space, the method comprising:
   discretizing the range space into a plurality of two-dimensional layers;
   for each layer of the plurality of layers:
      warping the first input image to the layer;
      warping the second input image to the layer; and
      for each pixel in the virtual image, determining a matching score based on the warped first input image and the warped second input image; and
   for each pixel in the virtual image:
      determining a layer with a best matching score;
      determining a color of the pixel in the layer with the best matching score; and setting a color of the pixel in the virtual image to be equal to the determined color.

2. The method of claim 1, further comprising rectifying the first input image and the second input image.

3. The method of claim 1, further comprising locating a viewpoint of the virtual image to be on a baseline.

4. The method of claim 1, further comprising enforcing scene consistency by performing local depth voting.

5. The method of claim 1, further comprising detecting an occlusion in the virtual image by performing local depth voting.

6. The method of claim 1, wherein the plurality of layers comprises a number of layers that is proportional to a volume of the range space.

7. The method of claim 1, wherein the plurality of layers comprises a number of layers that is inversely proportional to a quality of the virtual image.

8. The method of claim 1, wherein warping the first input image to the layer comprises performing inverse warping and bilinear interpolation.

9. The method of claim 1, wherein determining the matching score based on the warped first input image and the warped second input image comprises determining the matching score based on a statistical correlation between the pixel's neighborhoods in the warped images.

10. The method of claim 1, wherein determining the matching score based on the warped first input image and the warped second input image comprises;
   determining an initial depth; and
   restricting a marching search to a range from the initial depth.

11. The method of claim 1, wherein convolution operators are used to determine the matching scores for each pixel in the new view for one depth layer or for a plurality of depth layers.

12. The method of claim 1, wherein hardware acceleration is used to determine the matching scores for each pixel in the new view for one depth layer or for a plurality of depth layers.

13. The method of claim 1, wherein determining the layer with the best matching score comprises determining a layer that yields a greatest matching score.

14. The method of claim 1, wherein determining the color of the pixel in the layer with the best matching score comprises determining a color by a weighted combination of corresponding pixels of the input images according to one of a group containing the pixel's depth from a viewpoint of the virtual image and a function of an angle and a distance between the viewpoint of the virtual image and a viewpoint of the input image.

15. A system for generating a virtual image of a range space from a first input image of the range space and a second input image of the range space, the system comprising:
   means for discretizing the range space into a plurality of two-dimensional layers;
   means for warping the first input image to the layer, for each layer of the plurality of layers;
   means for warping the second input image to the layer, for each layer of the plurality of layers;
   means for determining a matching Score based on the warped first input image and the warped second input image, for each pixel in the virtual image, for each layer of the plurality of layers;
   means for determining a layer with a best matching score, for each pixel in the virtual image;
   means for determining a color of the pixel in the layer with the best matching score, for each pixel in the virtual image; and
   means for setting a color of the pixel in the virtual image to be equal to the determined color.

16. The system of claim 15, further comprising means for rectifying the first input image and the second input image.

17. The system of claim 15, further comprising means for locating a viewpoint of the virtual image to be on a baseline.

18. The system of claim 15, further comprising means for enforcing scene consistency by performing local depth voting.

19. The system of claim 15, further comprising means for detecting an occlusion in the virtual image by performing local depth voting.

* * * * *

UNITED STATES PATENT AND TRADEMARK OFFICE
CERTIFICATE OF CORRECTION

PATENT NO. : 7,161,606 B2  Page 1 of 1
APPLICATION NO. : 10/937034
DATED : January 9, 2007
INVENTOR(S) : Hector H. Gonzalez-Banos et al.

It is certified that error appears in the above-identified patent and that said Letters Patent is hereby corrected as shown below:

Column 11, line 13, please delete "marching" and insert --matching--.

Signed and Sealed this

Twenty-seventh Day of March, 2007

JON W. DUDAS
*Director of the United States Patent and Trademark Office*